May 28, 1963 SAKAE FUJIMOTO 3,091,467

DEVICES FOR SUPPORTING MAGNETIC TRANSDUCER HEADS ON MAGNETIC RECORDING AND REPRODUCING MACHINES

Filed Oct. 11, 1960

United States Patent Office 3,091,467

Patented May 28, 1963

3,091,467

DEVICES FOR SUPPORTING MAGNETIC TRANSDUCER HEADS ON MAGNETIC RECORDING AND REPRODUCING MACHINES

Sakae Fujimoto, Chofu, Japan, assignor to Riken Kogaku Kogyo Kabushiki Kaisha and Nihon Denki Bunka Kogyo Kabushiki Kaisha, Tokyo, Japan, both corporations of Japan Filed Oct. 11, 1960, Ser. No. 61,947
Claims priority, application Japan Oct. 14, 1959
2 Claims. (Cl. 274—4)

This invention relates to a device for supporting a magnetic transducer head on a magnetic recording and reproducing machine.

Most of magnetic recording machines can be used as magnetic reproducing machines. Any magnetic sheet carrying an information recorded thereon by a magnetic recording machine is frequently forwarded to another place where the information will be reproduced by a magnetic recording and reproducing machine different from the machine used to record the same. Therefore, in order to reproduce informations from standardized magnetic record sheets by using machines constructed according to a standardization, the reproducing machines of the type described are required to include magnetic transducer heads adapted to be exactly positioned on magnetized record tracks on the magnetic record sheets disposed in position on the machines. This means also that, upon recording, magnetic recording heads of magnetic recording machines should be first positioned exactly in the predetermined starting points thereof relative to nonmagnetized magnetic record sheets disposed in position on the machines and that the heads thus positioned should be surely guided to magnetically record an information on the magnetic record sheets during the movement of the head relative to the sheet. Apart from the fact that many machines constructed according to a common standardization are required to have high working accuracy, it can be said that reproducing transducer heads which are also used as recording ones must be mounted on the respective machines in their critical positions.

An object of the present invention, therefore, is to facilitate the critical mounting of a transducer head described just above.

In view of the above object, the invention resides in a device for supporting a magnetic transducer head for a magnetically recording and reproducing machine, said device comprising a circular seat member including at least three upright elements on the periphery thereof and a centrally pendent tubular element formed integrally with the same, and a positioning arm extending laterally from said seat member, said arm being provided at its free end with a notch or an aperture.

The invention will be more apparent from the following detailed description taken in conjunction with the accompanying drawings in which.

Figure 1:
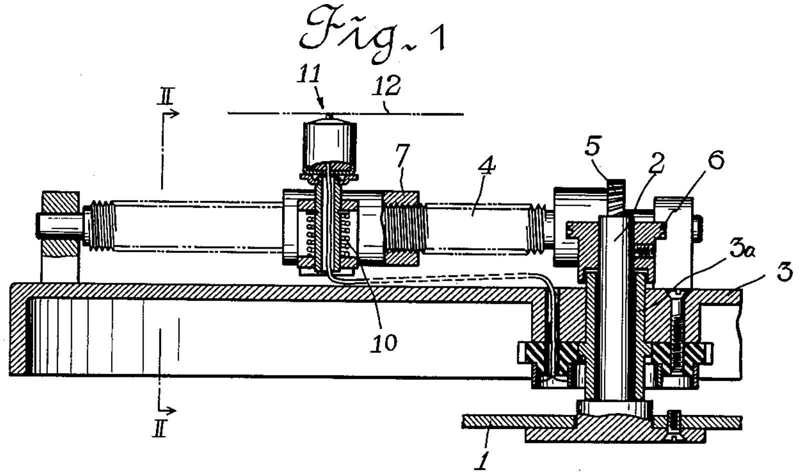
FIG. 1 shows a fragmental view, partly in vertical section and partly in side elevation of one form of a magnetic recording and reproducing machine including a device for supporting a magnetic transducer head constructed according to the invention.

Referring now to the drawings, a brief description will be made as to the manner in which a magnetic transducer head is supported on a magnetic recording and reproducing machine and in which the head is moved on the same during recording or reproducing operation.

A stationary plate 1 a portion of which is shown in the lower portion of FIG. 1 of the drawing includes a shaft 2 rigidly secured thereto. A circular disk 3 having a pendent periphery is centrally provided with a sleeve 3' through which the shaft 2 extends for rotation, and is adapted to be driven by a prime motor (not shown). A feed screw 4 is radially mounted on the disk 3 and includes a helical gear 5 secured thereto on one end portion which, in turn meshes with a helical gear 6 rigidly mounted on the upper end of the shaft 2. The feed screw 4 engages threadedly a short, internally threaded sleeve 7 including a pair of arms horizontally extending in the opposite directions. One of the arms **7*a* has its free end portion supported by the disk 3 through an adjusting screw 8 and the other arm 7*b* has its free end supported by the disk 3 through a roller 9. Intermediate the ends the arm 7*b* resiliently supports a transducer head 11 through an expansible spring 10 with the axis of the arm substantially perpendicular to the axis of the head. The spring 10 serves to bias the head 11** upwardly.

With the disk 3 rotated, the sleeve 7 is moved along the feed screw 7 to thereby move the head 11 radially toward or away from the center of the disk, dependent upon the direction of rotation of the disk. A magnetic record sheet represented by dot-and-dash line 12 (FIG. 1) is disposed in position on an upper plate (not shown) constructed substantially integrally with the plate 1 with the magnetizing layer of the sheet in contact with the upper face of the upper plate.

For recording an information on the magnetic record sheet 12 thus disposed, the transducer head 11 can first be brought into a predetermined position at that end of the feed screw 4 far away from the center of the disk 3 and then moved along the feed screw toward the said center by rotating the disk in a suitable direction of rotation while the head is energized with the information to be recorded. Therefore, the recorded sheet will carry an information in the form of a magnetized track of spiral type thereon.

If it is desired to reproduce a recorded information from a magnetized record sheet, the same may be disposed in the same position on the abovementioned upper plate as in recording operation and a reproducing head may be similarly moved.

From the foregoing it is understood that, when the sleeve 7 is in its predetermined position at the left-hand end of the feed screw 4 as viewed in FIG. 1, an air gap between a pair of magnetic pole pieces formed on the top face of the head 11 is required to assume a position critically fixed to the disk 3 simultaneously with the direction of the air gap parallel to the plane of FIG. 1.

According to the present invention, the above-mentioned requirement is met by providing a device for supporting the transducer head 11, comprising a circular seat member 12 including at least three upright elements **12*a* at its periphery and a centrally pendent tubular element 13 formed integrally with the same, and a positioning arm 12*b* extending laterally from the seat member 12', said arm being provided at its free end with a notch or an aperture 14**.

Before the supporting device of the invention will be used to mount a magnetic transducer head on a magnetic recording and reproducing machine, the following parts are provided for: A magnet is incased in a body of plastic material 17 within a cylindrical cup-shaped member 16 with an air gap between a pair of pole pieces of the magnet positioned centrally in the opening of the cup-shaped member and with a pair of leads to an operating coil 18 for the magnet extending through an aperture formed on the bottom of the cup.

Figure 3:
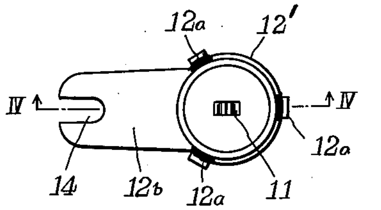
FIG. 3 shows a plan view on an enlarged scale of a portion of the device illustrated in FIG. 2.
Figure 4:
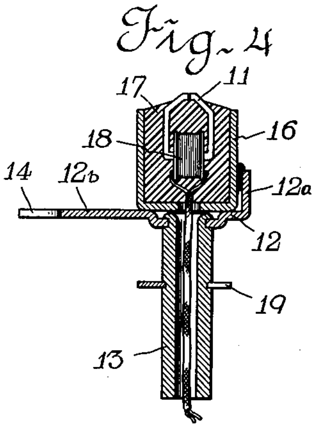
FIG. 4 shows a vertical section taken along the line IV—IV of FIG. 3.

The supporting device 12′, 13*a*, 12*b*, 13 according to the invention can now be put on a surface plate including a magnifying glass with the tubular element snugly fitted into a vertical opening of the complemental shape formed in the plate. Further, the surface plate is provided on its place with a vertical pin at such a position that the notch or aperture 14 of the positioning arm 12*b* will engage the same when the tubular element 13 is fitted into the said opening of the plate. Thus the supporting device is maintained in a predetermined position on the surface plate. Then the cylindrical cup-shaped member 16 including the transducer head 11 assembled therein as previously described is put on the seat 12′ disposed on the surface plate with the leads to the operating coil 18 threaded through the tubular member 13. The position of the cup-shaped member 16 relative to the seat 12′ is then critically adjusted such that the central line of the air gap between the pair of the magnetic pole pieces will coincide with a reference line which can be observed in the visual field of the magnifying glass. After the cup-shaped member 16 has been brought into the abovementioned position, the same can be secured to the seat 12′ by putting any suitable binder or a solder in a space between the outer periphery of the cup and the internal face of each of the uprights 12*a* (see FIG. 3).

Figure 2:
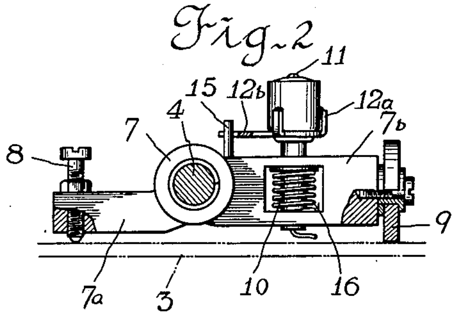
FIG. 2 shows a view, partly in side elevation and partly in vertical section, of the components as viewed in the direction of the arrow II—II of FIG. 1; with certain parts omitted.

The supporting device including the transducer head 11 assembled therein as above explained can be mounted to any suitable mounting on a magnetic recording and reproducing machine. For example, the device can be mounted to the arm 7*b* of the sleeve 7 with the tubular element 13 inserted into a transverse opening formed in the same as shown in FIGS. 1 and 2. In order to maintain the transducer head in its predetermined position relative to the sleeve 7 and accordingly to a magnetic record sheet disposed in place on the machine, the arm 7*a* is provided in that end portion thereof near to the sleeve 7 with a pin 15 adapted to engage the notch or aperture 14 of the positioning arm 7*a*. It will be seen that both the engagement of the notch 14 with the pin 15 and the insertion of the tubular element 13 into the transverse opening in the arm 7*b* permits the transducer head to be maintained in its predetermined critical position on the machine.

In order to maintain the head 11 in position and to bias the same upwardly, the tubular element 13 is provided with a flange and an expansible spring. The flange may comprise a split ring 19 adapted to be inserted into a relatively large lateral opening 16 formed in the arm 7*b* and to be snugly fitted into a peripheral groove formed on the tubular element 13. The spring may be the expansible spring 10 as previously described and disposed between the flange and the bottom of the lateral opening. Instead of the flange the tubular element may be constructed as a stepped tubular element.

From the foregoing it is apparent that the present invention has provided a device supporting a transducer head whereby the head can be assembled exactly in its critical position in any magnetic recording and reproducing machine produced according to mass production system in a simple manner.

What I claim is:

1. In a recording and reproducing machine of the type using a record medium having a magnetizable material on which intelligence is recordable and reproduceable along a spiral path, a recording and reproducing head comprising a transducer, means for moving said transducer along a spiral path relative to said record medium, magnetizable material for recording intelligence on said record medium and alternatively for reproducing intelligence record on said record medium, said transducer head comprising a seat for said transducer, means for adjusting said head on said seat relative to a reference mark in assembling said head and for positioning said head at a predetermined start position relative to said record medium comprising, a positioning arm fixed to said seat extending therefrom, said arm having a notch for releasably receiving a fixed member therein for holding said seat in a fixed position for adjusting said transducer in said seat at a desired position relative to said reference mark, and means for fixing said transducer head in said adjusted position in said seat.

2. In a recording and reproducing apparatus according to claim 1, comprising a pin positioned to releasably engage said notch for positioning said transducer in said predetermined start position relative to said record medium.

References Cited in the file of this patent

UNITED STATES PATENTS 2,958,736 Akai ---------------- Nov. 1, 1960